US007851746B2

(12) United States Patent
Brekenfeld

(10) Patent No.: US 7,851,746 B2
(45) Date of Patent: Dec. 14, 2010

(54) CALIBRATION CURVES FOR TIME-OF-FLIGHT MASS SPECTROMETERS

(75) Inventor: Andreas Brekenfeld, Bremen (DE)

(73) Assignee: Bruker Daltonik GmbH, Bremen (DE)

( * ) Notice: Subject to any disclaimer, the term of this patent is extended or adjusted under 35 U.S.C. 154(b) by 331 days.

(21) Appl. No.: 12/138,718

(22) Filed: Jun. 13, 2008

(65) Prior Publication Data

US 2008/0308724 A1 Dec. 18, 2008

(30) Foreign Application Priority Data

Jun. 13, 2007 (DE) ....................... 10 2007 027 143

(51) Int. Cl.
*H01J 49/40* (2006.01)
*B01D 59/44* (2006.01)

(52) U.S. Cl. ....................................... 250/287; 250/286

(58) Field of Classification Search ................. 250/281, 250/282, 286–288
See application file for complete search history.

(56) References Cited

U.S. PATENT DOCUMENTS 5,640,010 A * 6/1997 Twerenbold ................ 250/281
5,898,174 A * 4/1999 Franzen ...................... 250/287
5,909,259 A * 6/1999 Ishino ........................... 349/9
5,969,348 A * 10/1999 Franzen ...................... 250/282
6,188,064 B1 2/2001 Koster
7,202,473 B2 4/2007 Bateman et al. ............. 250/288
2002/0130259 A1 9/2002 Anderson et al. ........... 250/281
2006/0071160 A1 4/2006 Haase et al.

* cited by examiner

*Primary Examiner*—Bernard E Souw
(74) *Attorney, Agent, or Firm*—O'Shea Getz P.C.

(57) ABSTRACT

The invention relates to determining the masses from the time-of-flight values of ions in time-of-flight mass spectrometers where the accelerating voltage for the ions is not applied permanently, but is switched on at a certain time, resulting in a temporally changing acceleration for a short time after the voltage has been switched on. An aspect of the invention includes formally describing the effect of the temporally changing acceleration on the calibration curve—an effect which cannot be subjected to a strict mathematical-analytical calculation—by introducing a "reduced mass" $m-m_0$ instead of the mass m. The mass reduction factor $m_0$ does not describe a real mass difference, but a mass-dependent shortfall in the final kinetic energy after the ions have passed through the acceleration, a shortfall which can be observed with the temporally changing acceleration. This surprisingly simple formalism makes it possible to calculate the mass of the ions over a wide mass range and with an accuracy of approximately one part per million of the mass, using a calibration curve containing only four to six calibrated coefficients.

4 Claims, 4 Drawing Sheets

CALIBRATION CURVES FOR TIME-OF-FLIGHT MASS SPECTROMETERS

PRIORITY INFORMATION

This patent application claims priority from German patent application 10 2007 027 143.5 filed Jun. 13, 2007, which is hereby incorporated by reference.

FIELD OF THE INVENTION

The present invention relates to time-of-flight mass spectrometers, in particular to determination of the masses from time-of-flight values of ions in time-of-flight mass spectrometers where the accelerating voltage for the ions is not applied permanently, but is switched on at a certain time, resulting in a temporally changing acceleration for a short time after the voltage has been switched on.

BACKGROUND OF THE INVENTION

Time-of-flight mass spectrometry is undergoing enormous technical improvements which make it possible, in principle, to obtain very accurate mass determinations. However, mathematical representation of the calibration curve, that is, the functional relationship between mass and time-of-flight, has not been satisfactorily achieved yet and presents a particular problem.

Time-of-flight mass spectrometers with ionization by matrix-assisted laser desorption (MALDI) are currently advancing, in mass ranges between 1,000 and 6,000 Daltons, to mass resolutions of better than $R=m/\Delta m=50{,}000$, where $\Delta m$ is the full width at half-maximum (FWHM) of the mass signal at mass m. These values are surprising; they mean that, in the upper mass range, the MALDI time-of-flight mass spectrometers surpass other kinds of mass spectrometers, such as ICR mass spectrometers and Orbitrap™, whose fundamentally high mass resolution decreases as 1/m towards higher masses. The successes are based on improvements to the acceleration electronics and the detector, an increase in the sampling rates of the transient recorders and, in particular, better mastery of the MALDI processes by using improved laser technology as described, for example, in the German patent publication DE 10 2004 044 196 A1 (A. Hase et al., corresponding to GB 2 421 352 A and published U.S. Patent Application 20060071160). A significant contribution to the continuous improvement of this technology has been made by the long known time-delayed acceleration, as described in U.S. Pat. No. 5,654,545, for example, and, in particular, by the shaping of a temporally changing acceleration as described in German patent specification DE 196 38 577 C1 (J. Franzen, corresponding to GB 2 317 495 B and U.S. Pat. No. 5,969,348). In the simplest case, this temporally changing acceleration uses an RC element to slow down the switching on of the acceleration. This causes the region of maximum mass resolution to extend evenly over a wide mass range rather than being located at only one point of the mass spectrum.

Time-of-flight mass spectrometers with orthogonal ion injection (OTOF), which are usually operated with electrospray ion sources (ESI) but now increasingly with other types of ion source as well, are also advancing into these regions of mass resolution by virtue of similar technical improvements. Here, too, acceleration of the ions of a primary ion beam perpendicular to the previous direction, into the flight path of the mass spectrometer is carried out instantaneously by suddenly switching on the accelerating voltage.

It is fundamentally impossible to instantaneously (i.e., in no time), switch on an accelerating field by switching a voltage on a diaphragm which is arranged in a stack of other diaphragms and has a considerable capacitance with respect to the others. If the diaphragm has a low-resistance connection to a power supply, then, once the capacitance has charged up, which takes a finite time, a periodic overshooting always takes place due to the inductance of the supply lead. This overshooting is only slowly damped by the ever-present resistances of the materials, and has very damaging effects on the acceleration of the ions and hence on the calibration curve. The overshooting is therefore damped, as far as possible, by additional resistors in the supply lead to 140 a level where the aperiodic limiting case of the switching occurs, which results in a constant voltage in the shortest time, but not without a transition curve. To permit manufacture with better reproducibility, a slightly larger resistor is used, thus even falling short of this essentially ideal aperiodic limiting case, so that the final strength of the acceleration field is approached in the form of a creeping exponential curve. This “dynamic acceleration” bends the calibration curve in a way that closely resembles a MALDI time-of-flight mass spectrometer.

If ions are accelerated ideally to a kinetic energy E simultaneously and in an infinitesimally short time, one can determine the relationship between their time of flight $\Delta t=t-t_0$ over a distance L and their mass m from the basic equations:

$$E=(m/2)\times v^2=(m/2)\times L^2/(t-t_0)^2; \quad [1]$$

$$m=2E\times(t-t_0)^2/L^2; \quad [2]$$

$$t=t_0+L\times\sqrt{(m/2E)} \quad [3]$$

For various reasons, these equations are only valid as an approximation.

It has been long known that in MALDI mass spectrometers, the ions of all masses obtain a common velocity distribution with a common average initial velocity $v_0$ in the adiabatically expanding plasma of the matrix-assisted laser desorption (MALDI). The kinetic energy E after the electric post-acceleration of the ions thus comprises two components: the energy $E_U$ caused by the electric acceleration, and the initial energy $E_0=(m/2)\times v_0^2$, which results from the MALDI process:

$$E=E_U+E_0=E_U+(m/2)\times v_0^2. \quad [4]$$

If one introduces this additional premise into the above Equations [2] and [3] and then introduces some approximations which are based on the fact that the initial energy $E_0$ is very small compared to the energy $E_U$ from the electric acceleration, one obtains a very good approximate equation for the time-of-flight as a function of the mass:

$$t\approx c_0\times(\sqrt{m})^0+c_1\times(\sqrt{m})^1+c_3\times(\sqrt{m})^3, \quad [5]$$

and also a very good approximate equation for the mass as a function of the time of flight:

$$m=k_2(t-t_0)^2+k_4(t-t_0)^4, \quad [6]$$

which can be widely used for both MALDI time-of-flight mass spectrometers and time-of-flight mass spectrometers with orthogonal injection (OTOF-MS). The coefficients $c_0$ to $c_3$ $t_0$, $k_2$ and $k_4$ are determined by mathematical fittings from the ion signals of a mass spectrum of a calibration substance with accurately known masses. Such fitting procedures are familiar to those skilled in the art. For an OTOF-MS, where the ions do not have an initial velocity, the coefficient $c_3$ can even be assumed to be zero. The physical meaning and origin of the coefficients is immaterial for the application, but they are given below for reasons of completeness:

$$c_0=t_0;\ c_1\approx L/\sqrt{(2E_U)};c_3\approx L\ v_0^2/(\sqrt{32}(\sqrt{E_U})^3);k_2=2E_U/L^2+m_0v_0^2/L^2;k_4=2E_Uv_0^2/L^4. \quad [7]$$

Since these approximations do not lead to very good mass accuracies, further terms with additional coefficients are usually added, for example the terms $c_2\times(\sqrt{m})^2$ and $c_4\times(\sqrt{m})^4$ in Equation [5]. The mass accuracy that can be achieved with the equations moderately improves as the number of terms in the expansion series of the equations increases. This is only valid in the upper mass range, however; in the lower mass range, deviations occur which are not improved by these additional terms. The coefficients $c_2$ and $C_4$ cannot be given a physical meaning here.

In time-of-flight mass spectrometers, the ion currents of the ions reaching the detector are amplified, digitized with a constant frequency and stored as digital values in the order they were measured. Normal practice is to acquire many such single spectra in succession from one sample and add them together to form a sum spectrum, digital value by digital value. The original sum mass spectrum therefore includes a long series of digital measurement values where the relevant times of flight t of the ion signals do not appear explicitly, but only form the indices of the measurement series. The measurement series is analyzed for the occurrence of prominent signals; these represent the ion signals. A large number of algorithms and software programs, which are usually called "peak picking programs", are available for the identification of these ion signals. For an ion peak whose measured values regularly extend over several indices, the time of flight t is interpolated from the indices of the measured values. By using a good peak picking procedure, it is possible to obtain accuracies for the times of flight which are by far better than the time intervals of the digitizing rate.

The accuracy of the time of flight determination depends on the digitizing rate. The transient recorders of contemporary commercial time-of-flight mass spectrometers usually use a digitizing rate of two gigahertz; it is foreseeable, however, that measurement frequencies of eight or ten gigahertz will be available and will be used in the future. It is therefore to be expected that by using good interpolations of the peak picking procedures, accuracies of approximately one hundredth of a nanosecond will be achievable for the time-of-flight determination. A very accurate peak picking procedure based on the simultaneous analysis of all the ion signals of one isotopic group is presented in patent specification DE 198 03 309 C1 (C. Köster, corresponding to U.S. Pat. No. 6,188,064 and GB 2 333 893 B). Since a mass range of up to some 6,000 Daltons is acquired in approximately 100 microseconds, mass accuracies better than one part per million are to be expected in principle, but they have not been achieved as yet.

It is not possible to achieve mass accuracies of better than ten to a hundred parts per million (10 to 100 ppm) of the mass using the Equations [5] or [6] above as calibration functions. Residual errors therefore remain between the values thus obtained and the true values of the masses. If the residual errors are plotted over the mass axis, the diagram shows that, for repeated measurements with the same mass spectrometer, the error curve constantly exhibits similar behavior. These errors are therefore largely systematic residual errors rather than statistical errors. The established method of improving the mass accuracy is thus to approximate the behavior of the error curve using a higher order polynomial, and to use this polynomial to calculate and make allowance for the systematic residual errors with respect to the calibration curve. The skillful application of a seventh order polynomial, for example, in the mass range between 1,000 and 3,000 daltons means that mass accuracies of approximately five parts per million of the mass can be achieved.

The calibration mass spectrum must have a large number of fitting points to determine this polynomial of the systematic residual errors. It is known that a polynomial of the seventh order can be determined with only 8 masses as fitting points, but the polynomial can then assume values between the masses of the fitting points which are at an arbitrary distance. This polynomial method must therefore be applied with great care: with at least around 15 fitting points, which also have to fulfill further conditions, for instance separations which are as evenly spaced as possible with slightly narrower separations at the upper and lower limits. Mixtures of calibration substances that furnish more that 15 fitting points cleanly and without interference from impurity signals are difficult to produce. Moreover, since it has become customary to manually delete outlying measurements during the calibration, there is an exceptionally high risk of two calibrations by two different persons producing widely differing results. Furthermore, the polynomial method does not allow the calibration curve to be used outside the calibrated range, because the values of the polynomial outside the calibrated range usually stray randomly fast and randomly far in unpredictable directions.

SUMMARY OF THE INVENTION

If one takes a closer look at the error curve, one can see that the residual errors get very large, particularly for smaller masses. In the region between 500 daltons and 100 daltons, the residual error increases steadily and at an ever-increasing rate. It can be assumed that this residual error is connected to the dynamic acceleration. If the accelerating fields change as the ions are passing through, they no longer represent a conserving system and the ions acquire slightly different final energies E, depending on their velocity, i.e., on their mass. The energy shortfalls are minute. They are larger for low masses than for high masses because the slowly accelerated ions of high mass experience hardly any changes in the acceleration fields. A strictly valid integration over the temporally changing acceleration in the various acceleration regions leads to equations of such complexity that they cannot be used for a calibration.

An aspect of the invention includes making an assumption concerning the effect of the shortfalls in energy, namely that the mass determined from the time of flight t using one of the Equations [1] to [6], assuming a constant acceleration energy $E_U$, is not the mass m, but apparently a reduced mass $m-m_0$, where the value of the mass reduction $m_0$, which is constant for all masses, is extremely small compared to the mass m. The reduction mass $m_0$ is not a mass in the physical sense, although it has the physical dimension of a mass, but rather it is the effect of the mass-dependent shortfall in energy caused by the temporally changing acceleration, which is not taken into account in Equations [1] to [6].

The formal assumption of a reduced mass $m-m_0$ is based simply on the observation that the error becomes relatively larger towards smaller masses. If one introduces the reduced mass $m-m_0$ into Equation [5] and expands it with respect to $\sqrt{m}$, one obtains a further term $c_{-1}\times(\sqrt{m})^{-1}$, so that the series expansion is now:

$$t\approx c_{-1}\times(\sqrt{m})^{-1}+c_0\times(\sqrt{m})^0+c_1\times(\sqrt{m})^1+c_3\times(\sqrt{m})^3. \quad [8]$$

The reduction mass $m_0$ is obtained from the coefficients of $2c_{-1}/c_1$. Introducing a reduction mass $m_0$ is therefore equivalent to introducing the term with $1/\sqrt{m}$. Similarly, introducing the reduced mass $m-m_0$ into Equation [6] leads to a constant term:

$$m=k_0+k_2(t-t_0)\text{hu } \mathbf{2}+k_4(t-t_0)^4,\ \text{where } k_0=m_0. \quad [9]$$

The two Equations [8] and [9] have only four coefficients each. Further terms can, of course, be added to both equations, for example with the coefficients $c_{-2}$, $c_2$, $c_4$, $k_1$ and $k_3$, to improve the accuracy of the fitting. For best results, additional terms should be selected experimentally. The additional terms do not have a physical interpretation.

The calibration curves on the basis of Equations [8] or [9] provide surprisingly good results. With only one added term, i.e. with 5 coefficients each, the systematic residual errors can be reduced to around one to two parts per million of the mass over an extremely wide mass range of between 400 Daltons and over 3,000 Daltons; the statistical errors now dominate. In particular, with this calibration curve, it is possible to extrapolate towards larger masses far beyond the calibrated region with good results, see FIGS. 4 and 5. If, in the future, improved transient recorders allow improved determinations of the times of flight which reduce the statistical errors, then mass accuracies of less than one ppm can be expected, although it is possible that one or two further terms in the series expansion must be added to Equations [8] or [9].

These and other objects, features and advantages of the present invention will become more apparent in light of the following detailed description of preferred embodiments thereof, as illustrated in the accompanying drawings.

DETAILED DESCRIPTION

Figure 1:
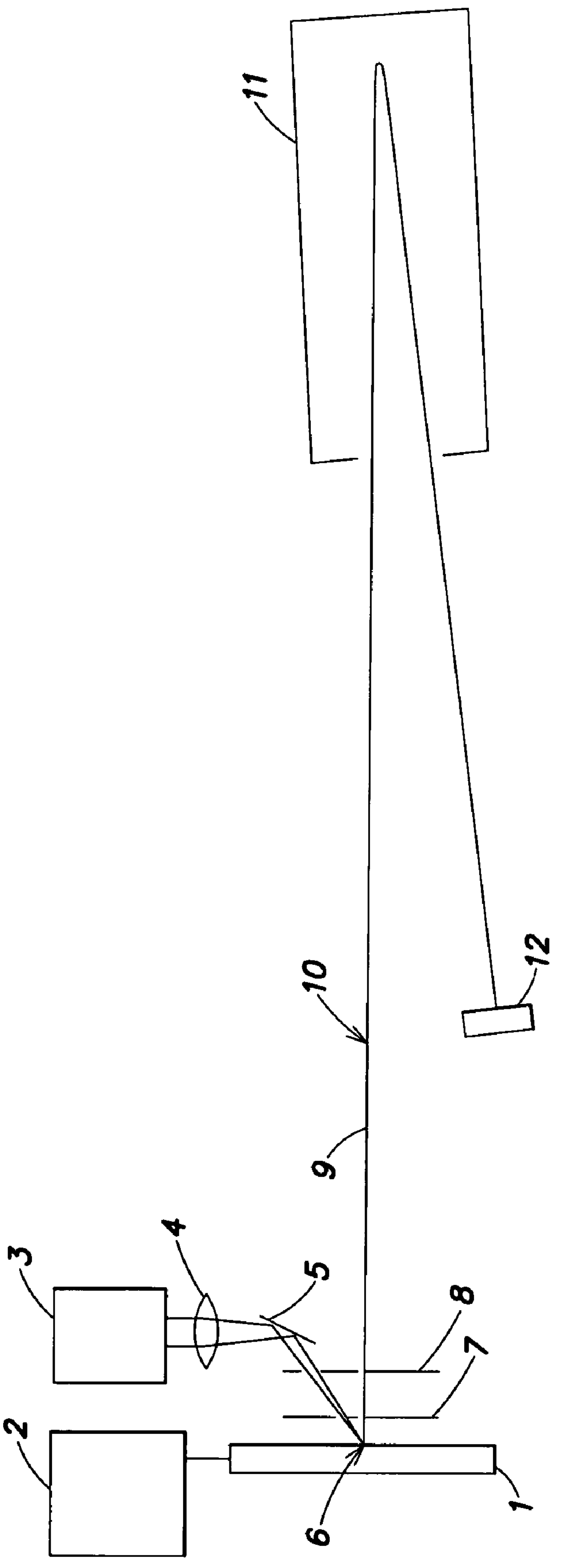
FIG. 1 shows a schematic representation of a reflector time-of-flight mass spectrometer where samples on a sample plate 1 are ionized by a laser 3 using matrix-assisted laser desorption (MALDI). The ions are accelerated by voltages on the diaphragms 7 and 8 with respect to the voltage on the sample support plate 1; on diaphragm 7, a voltage is switched on with a delay and then taken to a limit value in a short, but finite time.

The manner of operation of a MALDI mass spectrometer for the analysis of analyte substances whose masses are to be determined as accurately as possible is described using the schematic representation in FIG. 1. The substances under analysis are prepared together with matrix material on a sample plate 1. These preparations are termed "samples", and there can be many samples on a single sample plate. Every sample can contain large numbers of analyte substances. They are introduced into the ion source of the mass spectrometer together with the sample plate 1. In particular, one of the samples can be a calibration sample containing a large number of calibration substances whose masses extend reasonably evenly over a wide mass range without any interfering superpositions, and are precisely known.

Light flashes from a laser 3 are focused by a lens 4 and directed by a mirror 5 onto a sample 6 on the sample plate 1, causing analyte molecules of this sample 6 to be desorbed and ionized. The light flashes have durations of between 100 picoseconds and 10 nanoseconds; their profile can be shaped in a particular way. The light flashes each produce a plasma cloud of vaporized matrix material which also contains analyte molecules. This plasma cloud, which initially possesses an extraordinarily high density, adiabatically expands into the surrounding vacuum and accelerates all the constituents by viscous entrainment to the same velocity distribution with an average velocity $v_0$, which is the same for particles of all masses. During the expansion, some of the molecules are ionized, and the ions acquire the same velocity distribution.

By switching on voltages on the acceleration diaphragms 7 and 8, the ions are further electrically accelerated and formed into an ion beam 9. The voltage on the acceleration diaphragm 7 is switched on in such a way that the acceleration starts only after the laser desorption, with an adjustable time delay of between 50 and 500 nanoseconds approximately; this allows one species of analyte ion from the desorbed plasma cloud to be temporally focused in one location 10, as discussed in U.S. Pat. No. 5,654,545. For MALDI time-of-flight mass spectrometers, this method is widely known as "delayed extraction" (DE). The ions of one species of analyte ion all fly through the point 10 at exactly the same time, but with a different velocity. These ions can be precisely temporally focused onto the detector 12 by the velocity-focusing reflector 11 so that a high mass resolution is achieved for this species of analyte ion.

By applying the dynamic acceleration, for which the accelerating field between the sample plate 1 and the acceleration diaphragm 7 is not constant but asymptotically approaches an end value in finite time, all species of analyte ion of different masses can be temporally focused at practically exactly the same point 10, so that a high mass resolution is achieved everywhere in the mass spectrum, as is elucidated in the above-cited German patent DE 196 38 577 C1.

However, this "dynamic acceleration", with its positive effect on the mass resolution in the mass spectrum, leads to the mathematical problem that the equation between the time of flight and the mass cannot be derived in a strict analytical sense. Integrating the equations of motion of the ions in the temporally changing accelerating field leads to an extraordinarily complex expression which is not suited for use as a calibration curve.

A "calibration curve" is an equation which can quite possibly contain a number of still unknown coefficients but which fundamentally describes the relationship between mass and time of flight so well that, when it is applied with correctly determined coefficients, only very small residual errors occur in the mass determination. The coefficients can be determined by comparing known masses of ions from calibration substances with their measured times of flight by means of a fitting program (usually by minimizing the squared deviations). This, however, requires that an equation which describes the behavior well is available in the first place. As was mentioned above, Equations [6] and [7], which have been derived in the introduction, do not describe the relationship sufficiently well, and the additional polynomial method to correct the residual errors is too unstable. Moreover, the polynomial method does not work for extrapolations.

Figure 2:
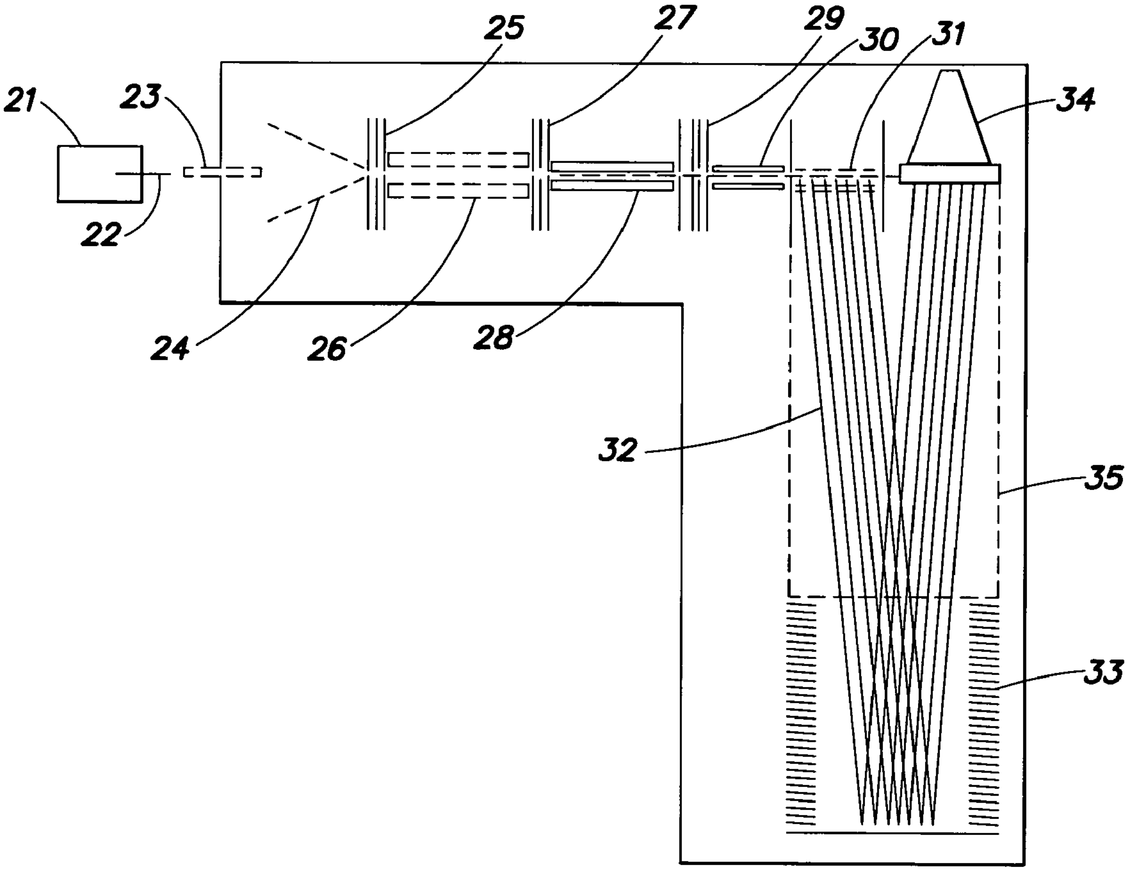
FIG. 2 shows a schematic representation of a reflector time-of-flight mass spectrometer with orthogonal ion injection (OTOF). A segment of the primary ion beam is deflected perpendicular to its previous direction in a pulser 31 by the sudden switching on of a voltage to shape the ion beam 32. This voltage also approaches a limiting value in a finite time.
Figure 3:
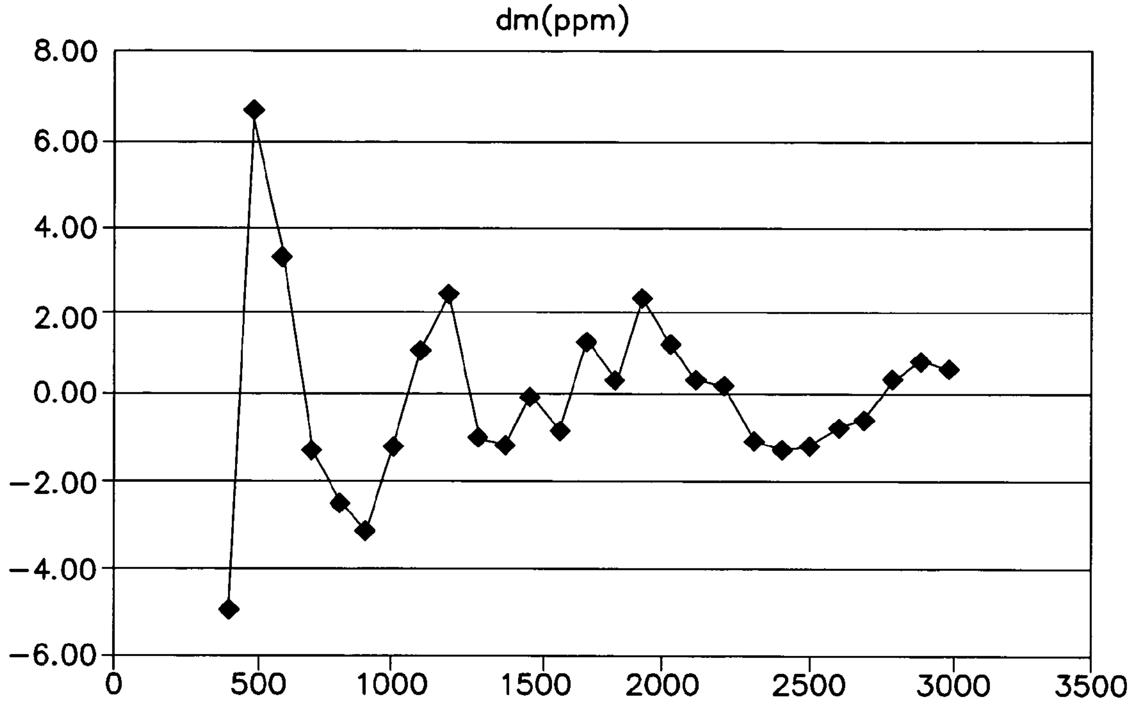
FIG. 3 shows the error curve between the calibration equation $t \approx c_0\times(\sqrt{m})^0+c_1\times(\sqrt{m})^1+c_2\times(\sqrt{m})^2+c_3\times(\sqrt{m})^3$ and simulated time-of-flight data in a MALDI time-of-flight mass spectrometer, i.e. without the term according to the invention $c_{-1}\times(\sqrt{m})^{-1}$. The maximum error amounts to more than 6 ppm.

Similar problems also exist for time-of-flight mass spectrometers with orthogonal injection of the ions because here, as well, the ions are subjected to an acceleration which is suddenly switched on. FIG. 2 is a schematic representation of a time-of-flight mass spectrometer which corresponds to the prior art. Ions are generated at atmospheric pressure in an ion source 21 with a spray capillary 22, said ions being introduced into the vacuum system through a capillary 23. An ion funnel 24 guides the ions through a lens system 25 into a first ion storage device 26, from which ions switched by a further lens system 27 can be transferred into the storage device 28. The storage device 28 is charged with collision gas in order to focus the ions by collisions. The switching and acceleration lens 29 loads the pulser 31 with through-flying ions of a fine primary beam 10 from the ion storage device 28. The lens 29 can be used as either a continuous or a switchable lens for the generation of individual ion packages. Between the switching lens 29 and the pulser 31 there is a flight region shielded by a casing 30, which is intended to reduce the electrical influence that the switchable lens and the pulser exert on each other, and particularly also to reduce all electrical and magnetic interferences affecting the primary ion beam. The pulser pulse ejects a section of the primary ion beam orthogonally into the drift region 35, which is at a high potential, thus creating the new ion beam 32. The ion beam 32 is reflected in the reflector 33 so as to be velocity-focused, and measured in the detector 34.

Switching on the voltages on the acceleration diaphragms in the pulser 31, which also cannot be switched to their maximum value instantaneously, creates a similar problem to the one that exists in the case of the MALDI time-of-flight mass spectrometer, especially as a periodic overshooting of the accelerating voltage must be avoided when the voltages are switched on.

An aspect of the invention includes describing formally in a very simple way the effect of these temporally changing accelerations on the calibration curve—an effect which cannot be subjected to a strict mathematical-analytical calculation—by introducing a "reduced mass" $m-m_0$ which is measured instead of the mass m if one does not mathematically take into account the mass-dependent shortfalls in the energy of the ions in the calibration curve. The mass reduction factor $m_0$ here is not a real mass difference, but rather an equivalent of the mass-dependent shortfall of the final kinetic energy after the ions have passed through the acceleration, which can be observed with the dynamic acceleration.

This surprisingly simple formalism makes it possible to calculate the mass of the ions using a simple calibration curve in the form of a series expansion [7] or [8] containing only four coefficients over a wide mass range and with an accuracy of a few parts per million (ppm) of the mass. If one or two further terms with one or two further coefficients are added, the accuracies achieved for the mass determination have residual errors of approximately one part per million. If, in the future, improved transient recorders make it possible to measure the time of flight more accurately, mass accuracies of below one part per million of the respective mass can be expected.

The formal assumption of a reduced mass $m-m_0$ results from a close inspection of the error curve. One can then observe that, especially for smaller masses, the residual errors become very large with respect to the Equations [5] and [6], which have been derived so as to be physically meaningful, and the residual errors are approximately proportional to 1/m. In the region between 500 Daltons and 100 Daltons, the residual error increases steadily at an increasing rate; and it should be noted that optimizing the coefficients already forces the residual errors to become minimized over the whole mass range. This already distorts the behavior of the residual error, and the increase proportional to 1/m is no longer easy to recognize.

It is quite possible for different embodiments to be used for switching the acceleration paths at the acceleration diaphragms. In the MALDI time-of-flight mass spectrometer shown in FIG. 1, both voltages on the diaphragms 7 and 8 can remain constant, while the voltage on the sample plate 1, which is initially at the potential of the diaphragm 7, is raised from this potential to a potential which is one to two kilovolts higher. Alternatively, the potentials on the sample plate 1 and diaphragm 8 can also be held constant, and the potential on the first acceleration diaphragm 7 can be reduced from the potential of the sample plate 1 to a lower potential. For MALDI time-of-flight mass spectrometers, it is essential that the plasma of the vaporization cloud can first expand in a field-free region.

In the time-of-flight mass spectrometer in FIG. 2, at least two, usually even three, potentials are switched simultaneously in the pulser. All the switched potentials approach the new potentials in a finite temporal curve.

It is difficult enough to integrate the equations of motion when only one acceleration region is subject to a temporal change of the acceleration field. For switching voltages on intermediate diaphragms, where both applied acceleration fields experience a temporal change, integration is extremely difficult; it is commonly assumed that integration in a closed analytical manner is in fact impossible. Numerically, the temporal characteristic of the flight paths can be obtained using suitable simulation programs, and these simulations allow for the penetration of the fields through the apertures of the diaphragms. But the numerically obtained time-of flight curves cannot be used as calibration curves.

It can be assumed with relative certainty that the residual errors which increase towards smaller masses are connected with this dynamic acceleration. If the accelerating fields change as the ions are passing through, this is no longer a conservative system. The ions acquire slightly different final energies E, depending on their velocity, i.e. on their mass. The energy shortfalls are minute. They are larger for low masses than for high masses because the ions of high mass experience hardly any changes in the acceleration fields. Since these shortfalls in the final energy cannot be calculated in the form of an analytical equation by a strictly valid integration over the temporally changing acceleration, the only way forward here is to use arbitrary assumptions. This consideration leads to the purely formal assumption of the "reduced mass" $m-m_0$, which is apparently measured if one ascribes the same final energy to ions of all masses for lack of mathematical means.

If one incorporates the formally introduced reduction mass $m_0$ into Equations [5] and [6], and recasts them in the form of a series expansion, one obtains, as a very good approximation, the Equations [7] and [8], which are offered here as calibration curves. The derivation of the approximation uses the fact that the reduction mass $m_0$ is very small compared to the mass m. Equations [5] and [6] are series expansions which take into account the same initial velocity $v_0$ of ions of all masses. The calibration curves according to an aspect of the invention [7] and [8] already offer a surprising accuracy for the mass determination, which is better than a few parts per million of the relevant mass over a mass range from approximately 300 to 3,000 daltons.

Figure 4:
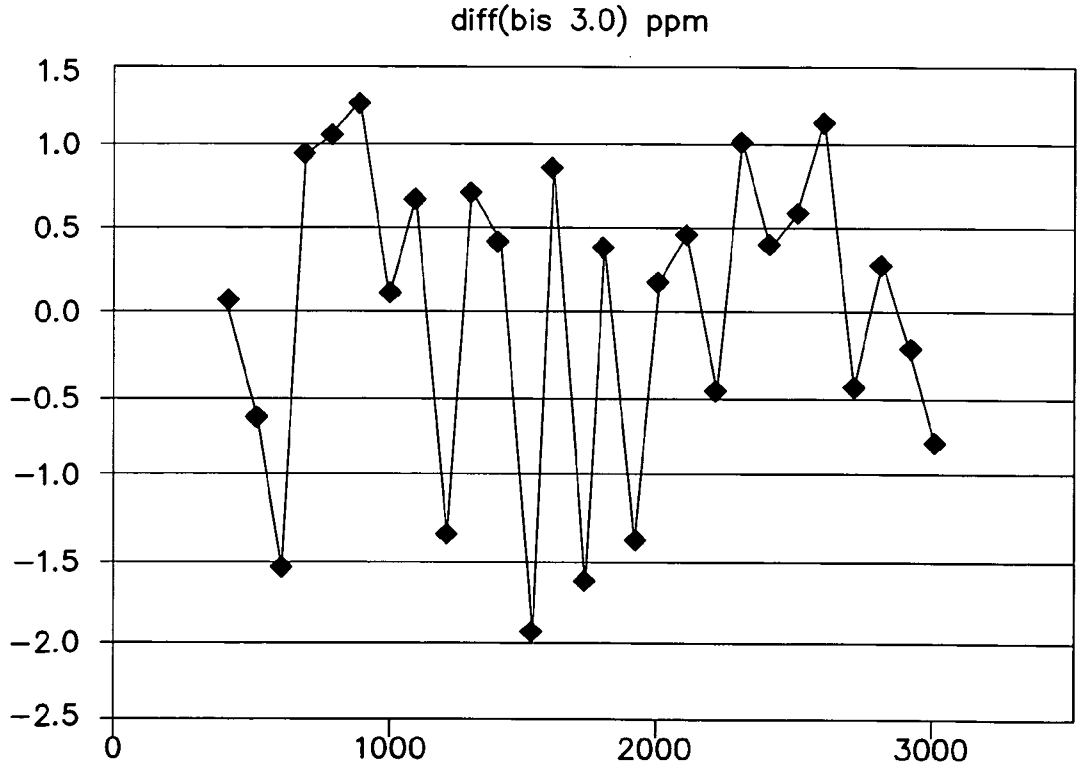
FIG. 4 shows the error curve between calibration equation and simulated time-of-flight data as shown in FIG. 3, but including the term according to the invention $c_{-1}\times(\sqrt{m})^{-1}$. The maximum error now amounts to only 2 ppm.
Figure 5:
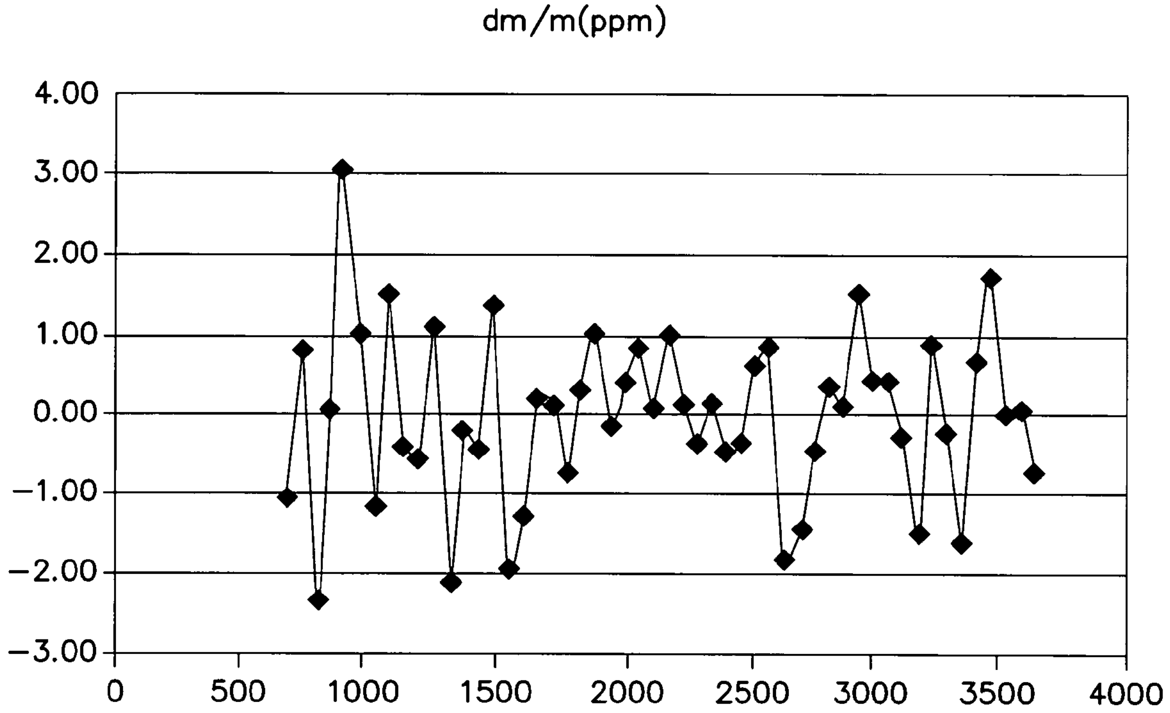
FIG. 5 shows the error curve between the calibration curve according to an aspect of the invention $t \approx c_{-1}\times(\sqrt{m})^{-1}+c_0\times(\sqrt{m})^0+c_1\times(\sqrt{m})^1+c_2\times(\sqrt{m})^2+c_3\times(\sqrt{m})^3$ and real measurement data from a MALDI time-of-flight mass spectrometer. The maximum error amounts to 3 ppm, the average error amounts to far less then 2 ppm; the error curve shows the largely statistical nature of the errors.

An even better accuracy can be achieved if one introduces further terms of the relevant series into the series expansions [7] and [8]. In Equation [7], for example, one has the option of introducing one or more of the terms $c_{-2}\times(\sqrt{m})^{-2}$, $c_2\times(\sqrt{m})^2$ or $c_4\times(\sqrt{m})^4$. The terms to be used are best selected experimentally by investigating which achieves the best mass accuracy. The use of only two further terms, i.e. the use of a calibration curve with six coefficients, has already led to accuracies of approximately one to three parts per million of the mass in our experiments, and in fact over a wide mass range of approximately 400 to 3,000 daltons, as FIG. 4 shows for simulated time-of-flight data and FIG. 5 for real measurements of times of flight in a MALDI mass spectrometer. The mass accuracy is even better in time-of-flight mass spectrometers with orthogonal injection of the ions.

Similarly, one can introduce further terms of the form $k_1(t-t_0)$ or $k_3(t-t_0)^3$ into the calibration curve [8] leading to similar successes.

If one investigates the residual errors which remain after these calibration curves have been applied, one can observe that they are predominantly of a statistical nature. It can therefore be expected that, with improved time-of-flight measurement due to the further development of the electronics, in particular the electronics of the transient recorder, mass accuracies of less than one part per million of the mass will, in the future, be controllable and therefore achievable in practice with the type of calibration curve according to the invention.

Although the present invention has been illustrated and described with respect to several preferred embodiments thereof, various changes, omissions and additions to the form and detail thereof, may be made therein, without departing from the spirit and scope of the invention.

What is claimed is:

1. A method for determining the masses of analyte ions in time-of-flight mass spectrometers, comprising:

switching on a voltage to accelerate the ions into the flight at a certain time and then approaches a limiting value in a finite time, wherein a calibration curve which is physically derived without taking into account the temporally changing acceleration is used to convert the measured times of flight t into masses m, and wherein the purely formal introduction of a reduced mass $m-m_0$, with constant value of $m_0$, instead of the mass m into the calibration curve takes into account the fact that the ions in the temporally changing acceleration field acquire a mass-dependent final energy.

2. The method of claim 1, wherein the series expansion $t \approx c_{-1}\times(\sqrt{m})^{-1}+c_0\times(\sqrt{m})^0+c_1\times(\sqrt{m})^1+c_3\times(\sqrt{m})^3$ or $m=k_0+k_2(t-t_0)^2+k_4(t-t_0)^4$ obtained by the introduction of the reduced mass $m-m_0$ is used as the calibration curve.

3. The method of claim 2, wherein one or more of the terms $c_{-2}\times(\sqrt{m})^{-2}$, $c_2\times(\sqrt{m})^2$, $c_4\times(\sqrt{m})^4$, or $k_1(t-t_0)$ and $k_3(t-t_0)^3$ is added to the series expansions.

4. The method of claim 3, wherein one or more of said terms is being selected experimentally according to the contribution they make to improve the accuracy of the mass determination.

* * * * *